United States Patent [19]

Audran et al.

[11] 4,302,523
[45] Nov. 24, 1981

[54] MAGNETIC RECORDING ELEMENTS CONTAINING TRANSPARENT RECORDING LAYER

[75] Inventors: Roger G. L. Audran, Villebon-sur-Yvette-Palaiseau; Albert P. Huguenard, Le Plessis Trevise, both of France

[73] Assignee: Eastman Kodak Company, Rochester, N.Y.

[21] Appl. No.: 94,145

[22] Filed: Nov. 14, 1979

Related U.S. Application Data

[62] Division of Ser. No. 881,968, Feb. 27, 1978, Pat. No. 4,279,845.

[30] Foreign Application Priority Data

Mar. 2, 1977 [FR] France ............................. 77 06066

[51] Int. Cl.$^3$ ........................... G03C 7/24; G11B 5/70
[52] U.S. Cl. .................................. 430/140; 235/493; 360/2; 428/328; 428/329; 428/694; 428/900; 428/918; 430/523; 430/524
[58] Field of Search ............... 428/918, 900, 328, 329, 428/694; 427/130, 131, 128; 430/495, 524, 523, 140; 252/62.54, 62.56; 235/493; 360/2

[56] References Cited

U.S. PATENT DOCUMENTS

| | | | |
|---|---|---|---|
| 2,950,971 | 12/1957 | Lewin | 430/17 |
| 3,782,947 | 1/1974 | Krall . | |
| 3,922,430 | 11/1975 | Mayer | 428/900 |
| 4,003,743 | 1/1977 | Akashi et al. | 427/131 |
| 4,126,727 | 11/1978 | Kaminski | 428/172 |
| 4,186,228 | 1/1980 | Ogawa et al. | 428/900 |
| 4,199,614 | 4/1980 | Ziolo | 428/406 |

FOREIGN PATENT DOCUMENTS

686172 5/1964 Canada .

OTHER PUBLICATIONS

Lewin, "The Infrared Transparency of Magnetic Tracks", Journal of the Society of Motion Picture and Television Engineers, vol. 66, No. 9, Sep. 1957.

*Primary Examiner*—Stanley S. Silverman
*Attorney, Agent, or Firm*—B. D. Wiese

[57] ABSTRACT

Magnetic recording elements containing substantially transparent magnetic recording layers which exhibit excellent magnetic recording and reproducing characteristics. Such elements contain a support and a transparent magnetic recording layer. The recording layer has a thickness up to about 5 microns and contains acicular, magnetizable particles having an average width of less than about 0.06 micron and an average length up to about 1 micron. These particles are substantially homogeneously dispersed in a medium that comprises a binder and has a refractive index which is substantially the same throughout the thickness of the magnetic recording layer. The concentration of the binder is at least about 10 parts per 100 parts, by weight, of the particles and is up to about 30 parts, by weight, for particles having an average length of at least about 0.06 micron and up to about 40 parts, per 100 parts, by weight, for particles having an average length of less than about 0.06 micron. Such magnetic recording layers have a total transmission of at least 20 percent for visible light having a wavelength of 632.8 nm and a ratio of direct transmission to total transmission at this wavelength of at least 50 percent.

The process for preparing such elements, which are particularly useful for motion picture films, is also disclosed.

10 Claims, 1 Drawing Figure

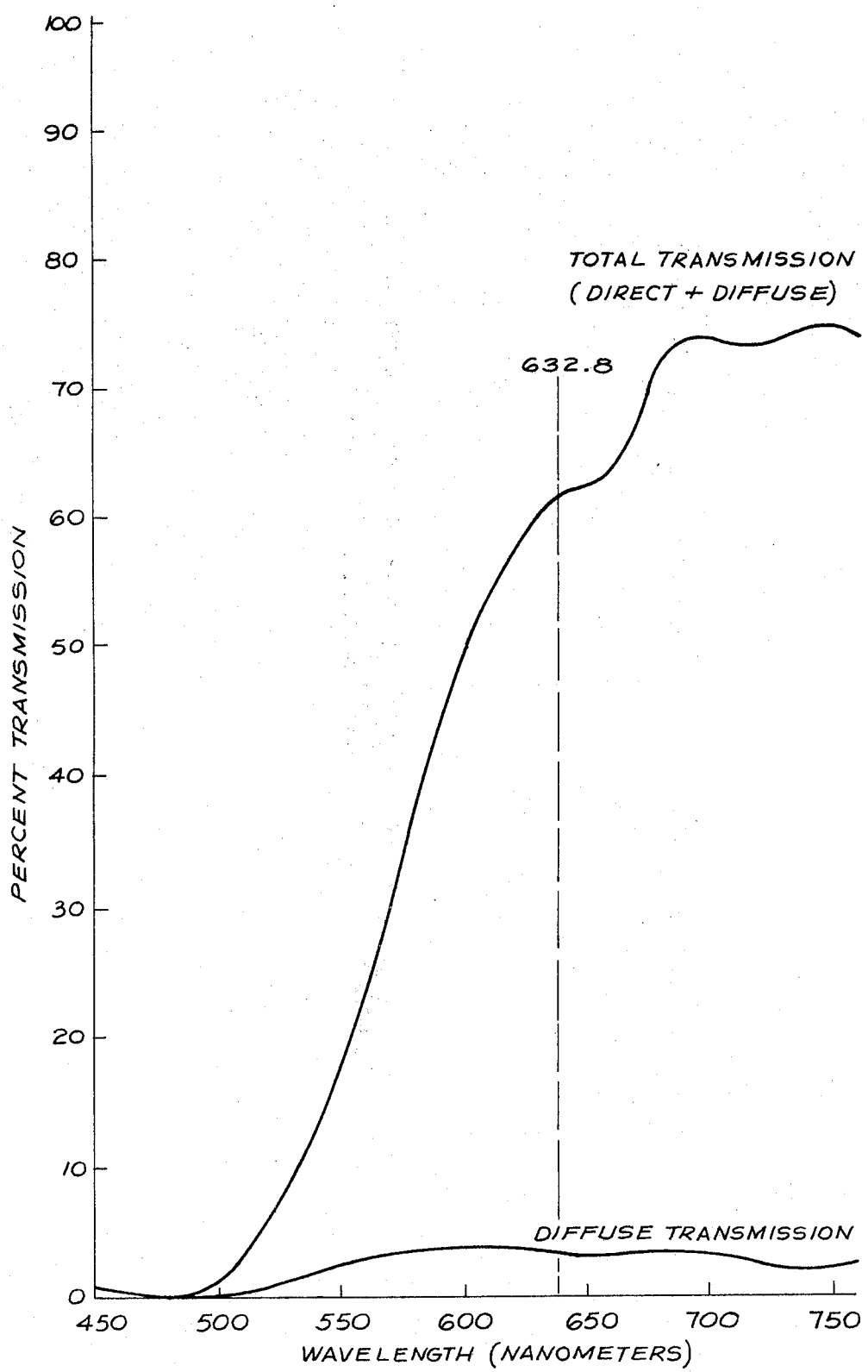

MAGNETIC RECORDING ELEMENTS CONTAINING TRANSPARENT RECORDING LAYER

This is a division, of application Ser. No. 881,968, filed Feb. 27, 1978 now U.S. Pat. No. 4,279,845.

BACKGROUND OF THE INVENTION

1. Field of the Invention

This invention relates to magnetic recording elements and processes for preparing such elements. In one of its aspects, this invention relates to magnetic recording elements having magnetic recording layers that are substantially transparent to visible light while exhibiting excellent magnetic recording and reproducing characteristics, and also to processes for preparing such elements.

2. Description Relative to the Prior Art

Conventional magnetic elements that are used for recording sounds or images are generally opaque to visible light regardless of the nature of the magnetic particles used in such elements. However, it is known that magnetic layers formed from magnetic iron oxide dispersed in a binder will transmit infrared radiation. For example, U.S. Pat. No. 2,950,971, issued Dec. 17, 1957, describes an element having multiple sound tracks and comprising a transparent support coated successively with (1) an optical sound track capable of modulating infrared and (2) a magnetic sound track that contains magnetic iron oxide dispersed in a binder and uniformly transmits infrared. The infrared radiation is transmitted through the magnetic sound track to reproduce a previously exposed and processed optical sound track. The element described in this patent may be a motion picture film and the magnetic sound track does not cover that portion of the film used in the projection of images.

As shown in French Pat. No. 1,227,788, granted Mar. 7, 1960 and Canadian Pat. No. 686,172, issued May 12, 1964, a magnetic recording layer may be transparent to visible light when it is very thin and contains a very low concentration of magnetizable particles such as gamma ferric oxide. According to these patents such a layer is coated over a layer containing descriptive material which allows a user to simultaneously hear and see certain subject matter. However, as pointed out in these patents, the electromagnetic characteristics i.e. the magnetic recording and reproducing characteristics of such a layer are inferior to those of conventional magnetic layers as a result of the very low concentration of magnetizable particles.

U.S. Pat. No. 3,782,947, issued Jan. 1, 1974, discloses a photographic product which carries magnetizable particles that are uniformly distributed across the image area of the product. The particle distribution and size(s) are so designed that the composite granularities of the photographic and magnetic recording media are such that the magnetic distribution is essentially transparent in a photographic sense. According to this patent, the photographic image can be viewed via the magnetic distribution, and the magnetic distribution can be employed for recording and playback information.

It is evident that an element containing a magnetic layer which combines transparency to visible light with magnetic recording and reproducing characteristics which are comparable to conventional opaque magnetic layers would represent an advance in the prior art. Likewise, it is evident that it would be desirable to obtain such transparency without the need for matching the granularity of a magnetic medium to that of a photographic medium, as in U.S. Pat. No. 3,782,948. The process for preparing such elements would, of course, clearly provide an advance in the prior art.

SUMMARY OF THE INVENTION

In accordance with this invention we have provided that a magnetic recording element containing a magnetic recording layer having a combination of features as described herein, including a relatively high concentration of magnetizable particles with respect to binder, that is transparent to visible light and also exhibits magnetic recording and reproducing properties that are of the same order as those of conventional magnetic layers that are opaque to visible light. As pointed out in detail in the following specification and claims, magnetic recording elements containing such layers are obtained using specific process steps that are combined to bring about this unique result. By practicing this process, there is obtained a magnetic recording layer exhibiting a characteristic total transmission of at least about 20 percent for visible light having a wavelength of 632.8 nm (emission of a helium-neon laser) and a ratio of direct transmission to total transmission of at least 50 percent at that same wavelength. The total transmission of a layer consists of light which passes through the layer by direct transmission (also referred to in the prior art as specular transmission) and by diffuse transmission.

The present invention includes a magnetic recording element comprising a support and a transparent magnetic recording layer having a thickness up to about 5 microns. This layer contais acicular, magnetizable particles, i.e. needle-like particles, having an average width of less than about 0.06 micron and an average length up to about 1 micron. These acicular particles are substantially homogeneously dispersed in a medium that comprises a binder and has a refractive index which is substantially the same throughout the thickness of the transparent magnetic recording layer. The concentration of this binder is at least about 10 parts per 100 parts, by weight, of the magnetizable particles; up to about 30 parts, by weight, for particles having an average length of at least about 0.06 micron and up to about 40 parts, per 100 parts, by weight, for particles having an average length of less than about 0.06 micron. As previously indicated, the magnetic recording layer has a total transmission of at least 20 percent for visible light having a wavelength of 632.8 nm and a ratio of direct transmission to total transmission at this wavelength of at least 50 percent. Often this total transmission is at least 60 or 70 percent, or more while the ratio of direct to total transmission is frequently considerably above 50 percent, e.g. 60, 80, 90 percent or even greater.

The present invention also includes a process for preparing an element containing a magnetic recording layer which combines excellent magnetic recording and reproducing characteristics with transparency, which process comprises:

(a.) forming a substantially homogeneous dispersion of acicular magnetizable particles in a medium comprising a solution of substantially transparent binder in solvent. These particles have an average width of less than about 0.06 micron and an average length up to about 1 micron, the concentration of said binder being at least about 10 parts per 100 parts, by weight, of said particles; up to about 30 parts, by weight, for particles having an average length of at least about 0.06 micron and up to about 40 parts, by weight, for particles having an average length of less than about 0.06 micron, (b.) coating a support with this dispersion in an amount sufficient to provide a final dry layer thickness up to about 5 microns, (c.) removing substantially all solvent from the layer and (d.) treating the layer containing particles having an average length of at least about 0.06 micron using one or both of the following process steps, (1.) compacting the layer while it is in a malleable state to reduce its thickness, (2.) imbibing into the layer a substantially transparent liquid having a refractive index that is substantially the same as that of the binder.

As previously indicated, the magnetic recording layer prepared according to this process has a total transmission of at least 20 percent for visible light having a wavelength of 632.8 nm and a ratio of direct transmission to total transmission at said wavelength of at least 50 percent.

BRIEF DESCRIPTION OF THE FIGURE

The drawing shows the relationship of the total transmission to diffuse transmission, as a function of wavelength, in nanometers, for a transparent magnetic recording layer obtained by the practice of this invention. It can be seen from the curve set forth in the drawing that such layers exhibit unexpectedly low absorption in the visible region of the spectrum, particularly in the green and red regions.

DESCRIPTION OF SPECIFIC EMBODIMENTS

The magnetizable particles dispersed in the transparent recording and playback layers of this invention are acicular or needle-like magnetizable particles. They have an average width (minor axis) of less than 0.06 micron, often less than about 0.05 micron and frequently in the range of about 0.02 to 0.05 micron. The average length (major axis) of these particles is up to about 1 micron, often up to about 0.8 micron and frequently in the range of about 0.2 to 0.6 micron. Suitable acicular particles are ferro- and ferri-magnetic particles that have at least ten percent preferably fifty percent or greater transmission of visible radiation, particularly visible radiation in the region of 632.8 nm. Typical acicular particles of this type include, for example, particles of ferro- and ferri-magnetic iron oxides such as the brown gamma ferric oxide, complex oxides of iron and cobalt, various ferrites and the like. Acicular gamma ferric oxides or ferrous ferric oxides, which can be undoped or can contain doping metal ions, are particularly useful in this invention. The particles can be doped with one or more ions of a polyvalent metal such as cobalt, nickel, zinc, manganese, chromium, or the like. The concentration of dopant ion employed is subject to variation, depending upon such things as the size of the magnetizable particles. However, dopant levels in the range of about 1 to 6 percent, by weight, often about 1 to 3 percent, by weight, particularly with cobalt ion, are suitable.

The magnetizable particles, present in the elements of this invention, are substantially homogeneously dispersed in a medium that comprises a binder. In practicing the invention, a rather large amount (by weight) of acicular magnetizable particles is used with respect to this binder. This results in a magnetic recording layer which has a high density, such density being the weight of magnetizable particles; per unit volume of the layer. It is the ratio of the weight of magnetizable particles, expressed in milligrams, per volume of magnetic recording layer, expressed in cubic millimeters. Due to their high density, the magnetic recording layers of this invention, exhibit excellent magnetic recording and reproducing properties.

The concentration of the binder employed in dispersing the magnetizable particles depends upon the average length of the particles, a larger concentration of binder being used with the shorter particles. The concentration of this binder is at least about 10 parts per 100 parts by weight, of the magnetizable particles; up to about 30 parts, by weight, for particles having an average length of at least 0.06 micron and up to about 40 parts per 100 parts, by weight, for particles having an average length of less than about 0.06 micron. Since the average width of the magnetizable particles employed in the practice of this invention is less than about 0.06 micron, it can be seen that a larger concentration of binder (10 to 40 parts) is employed with magnetizable particles having two of its dimensions, i.e. both average width and average length, less than about 0.06 micron. The concentration of binder in such case can, of course, be less than 40 parts, by weight, and is often in the range of about 10 to 25, or even 10 to 15 parts by weight, per 100 parts of magnetizable particles. When longer magnetic particles, i.e. those having an average length of at least about 0.06 micron, are employed in the practice of this invention, the concentration of binder is in the range of about 10 to about 30, often about 10 to about 15 or 25, parts by weight, or binder per 100 parts, by weight, of magnetizable particles. The acicularity, i.e. the ratio of length to width, of the magnetizable particles employed in practicing this invention is subject to wide variation. Generally, the acicularity of such particles is at least 2 and often 15 or more. For particles having both an average width and length up to about 0.06 micron, and particularly gamma ferric oxide (undoped or doped) a suitable acicularity is in the range of about 2 to 10. For particles having an average width below 0.06 micron and an average length up to 1 micron, e.g. an average length of about 0.1 to 0.4 or 0.5 micron, and often about 0.2 micron, a suitable acicularity is in the range of about 5 to 40, generally about 10 to 40. Preferred particles of this size are particles of gamma ferric oxide (undoped or doped).

The binders that can be used in the practice of this invention include any of the substantially transparent binders well known for the manufacture of magnetic recording layers. Typical binders are polymeric binding agents such as copolymers of vinyl acetate with vinyl chloride, copolymers of vinylidene chloride with acrylonitrile, copolymers of acrylic and/or methacrylic esters, polyvinylbutyral, copolymers of butadiene with styrene, terpolymers of acrylonitrile, vinylidene chloride and maleic anhydride, cross-linked or non-cross-linked, homopolymers or copolymers such as polyamide, polyurethanes, polyesters, and the like, as well as mixtures of these binders. Good results can be obtained with a copolymer of vinyl acetate with vinyl chloride, partially hydrolyzed, and possibly cross-linked by an isocyanate or similarly reactive constituent, or by using polyurethanes or a mixture of these binders.

In forming the magnetic recording layers of this invention, the magnetizable particles are homogeneously dispersed in a medium which contains one or more of the substantially transparent binders described previously, and a solvent for the binder. The dispersing medium can also contain transparent addenda, for example, plasticizers such as tricresyl phosphate or dioctyl phthalate or lubricants such as carbonic acid mixed esters, as exemplified by ethyl cetyl phosphate and described in French Pat. No. 2,094,663 and like addenda. In the final layer the medium has a refractive index which is substantially the same throughout the thickness of the magnetic recording layer. As pointed out hereinafter, this medium can contain discrete, nonmagnetizable voids, but such voids can be compressed or filled with a liquid whose refractive index is substantially the same as the binder employed in the medium. As a result, the medium will then have the substantially unchanged refractive index referred to herein and set forth in the claims.

After the dispersion of acicular magnetizable particles in a solution of binder in solvent is formed, it is coated onto a support in an amount sufficient to provide a final dry layer thickness up to about 5 microns, generally up to about 4 microns and preferably about 1 to 3 microns. The dispersion can be coated directly on the support or it can be coated over other layers using any process suitable for this purpose, including, for example, those described in the "Encyclopedia of Polymer Science and Technology", John Wiley and Sons, 1965, Volume 3, pages 765–833. Substantially, all solvent is then removed from the layer by any suitable means.

In those instances where magnetizable particles having a length of at least 0.06 micron are used in the magnetic recording layer it is given at least one further treatment. In this case the layer is compacted while it is in a malleable state to reduce its thickness and/or a substantially transparent liquid having a refractive index that is substantially the same as the binder for the magnetizable particles is imbibed into the layer. One method of compacting the magnetic recording layer is to calender it by passing the element containing this layer (e.g. before the binding agent has lost its thermoplastic properties) between very smooth, hard steel rolls or between a very smooth, hard steel roll and a cotton roll with the steel roll in contact with the magnetic recording layer. The magnetic recording layer is advantageously subjected to calendering several times until the amount of light diffused by the layer is constant, and preferably, the layer is heated to facilitate compacting. If calendering is to be used, it is generally desirable to select a binder that has a relatively low glass transition temperature (Tg) since such a binder is particularly suited to calendering. In calendering the layer, it is generally sufficient to heat the steel roll to a temperature at least 10° C. above the Tg of the binder. Calendering the magnetic recording layer is very desirable because this generally provides a layer of very high density, i.e., a very high weight of magnetizable particles per unit volume. It is desirable to calender the magnetic recording layer to a thickness below about 4 microns, and in most cases, to a thickness in the range of about 1 to 3 microns since the transparency of the layer increases as the thickness of the layer decreases.

Compacting the magnetic recording layer while it is still in the malleable state using means such as calendering provides an extremely smooth surface which has a favorable effect upon the transparency of the layer. This surface smoothness can be expressed in terms of "percent contact area". This "percent contact area" is determined with relation to a reference surface consisting of the hypotenuse surface of a transparent prism. The value of an incident luminous flux directed for total reflection from the hypotenuse is equal to $\phi$. The flux reflected by the hypotenuse surface is, therefore, equal to $\phi$ but is reduced and becomes equal to $\phi'$ when one places an absorber in optical contact with the hypotenuse. A sample of the magnetic element being measured, when contacted under controlled pressure against the surface (with the outermost magnetic recording layer of the element in contact with the surface) produces light absorption that increases as the smoothness of the magnetic recording layer increases. The "percent contact area" is equal to $$\frac{\phi - \phi'}{\phi} \times 100.$$

The value of the "percent contact area" increases with the flatness of the surface of the magnetic recording layer, i.e., with the surface smoothness of the layer. The magnetic recording layers obtained by compacting the surface, as described herein, exhibit a surface smoothness determined as "percent contact area" of at least about 70 percent and often in the order of 80 percent or more. Such high surface smoothness provides intimate physical contact between a recording or reproducing magnetic head and the magnetic recording layer. This improves signal reproduction and is particularly significant in video recording where short wavelengths are used.

As previously indicated, the transparency of magnetic recording layers containing acicular magnetizable particles having a length of at least 0.06 micron can be improved by imbibing into it a substantially transparent liquid having a refractive index that is substantially the same as the binder in the layer. This liquid is believed to partially or completely fill discrete, nonmagnetizable voids or pores that are present in the medium in which the acicular magnetizable particles are dispersed. These voids or pores are non-solid, contain entrapped air and are formed within the medium when the binder solvent is removed during drying of the magnetic recording layer. Low viscosity oils such as linseed oil are examples of satisfactory materials that can be imbibed into the magnetic recording layers according to this invention.

As pointed out herein, the compacting and imbibing treatments are used with magnetic recording layers containing acicular magnetizable particles having a length of at least 0.06 micron, i.e. the longer particles employed in practicing this invention. However, each of these treatments can be used, alone or in combination, with magnetic recording layers containing shorter acicular magnetizable particles, i.e., those having a length less than about 0.06 micron. It is possible to obtain a magnetic recording layer having the transparency characteristics (total transmission and ratio of direct transmission to total transmission) described herein without submitting such a layer to these subsequent treatments after coating and drying. However, it is generally advantageous to use one or both of these subsequent treatments to further improve the transparency characteristics of a magnetic recording layer containing the shorter acicular magnetizable particles.

In practicing this invention, transparent liquids such as linseed oil can be imbibed into the magnetic recording layers using any method suitable for this purpose.

For example, the magnetic element can simply be dipped in the liquid or the liquid can be applied to the magnetic recording layer using conventional coating techniques such as hopper coating, spray coating and the like.

To obtain good magnetic and optical properties the dispersion of acicular magnetizable particles in a medium comprising a solution of binder in solvent used in forming the magnetic layers of this invention must be homogeneous since these magnetic particles tend to form agglomerates upon coating. Such agglomerates are detrimental to light transmission and are known to provide undesirable magnetic discontinuities and result in noise. To avoid the formation of these aggregates, coating dispersions, including those employed in the practice of this invention, are generally subjected to shear after preparation and prior to coating. Many suitable techniques are known which will avoid agglomeration of magnetic particles and/or the formation of undesirable binder "slugs". Any of these techniques, many of which are known in the paint industry, can be employed to achieve the substantially homogeneous dispersion of magnetizable particles in the dispersing medium used in this invention. In many cases, a dispersing agent such as a fatty acid amine derivative will facilitate dispersion of the magnetizable particles.

Suitable solvents that can be employed in the medium used to disperse the magnetizable particles include organic materials such as methyl ethyl ketone, methyl isobutyl ketone, ethyl acetate, butyl acetate, cyclohexanone, butyl alcohol, methylene chloride, tetrahydrofuran dioxane, dimethylformamide and the like as well as mixtures thereof.

After the dispersion of acicular, magnetizable particles is formed it is coated onto a support. The dispersion can be coated directly on the support or it can be coated over or under other layers to form the magnetic recording layer. The acicular, magnetizable particles can be aligned in the still wet fluid layer, i.e. the layer still containing solvent, after it is applied to the support. This alignment can be accomplished by conventional means such as applying a magnetic field to the magnetic recording layer while it still contains solvent and the acicular particles are sufficiently movable therein to be aligned. A suitable magnetic field strength for this purpose is generally about 2000 Oersteds.

The magnetic dispersion described herein can be applied to a substantially transparent support or to an opaque support. The transparency or opaqueness of the support depends upon the use the element will be put to, e.g. transparent supports are used for motion picture film in which the transparent magnetic recording layer of this invention provides a means for recording and reproducing audio information. The transparent magnetic recording layers of this invention can also be coated over a layer which contains descriptive material and is coated on an opaque support. This allows a user to view the descriptive material by reflected light and to simultaneously hear subject matter recorded in the magnetic recording layer. Clearly, the magnetic dispersions described herein can be applied to a wide variety of nonmagnetizable supports, including discs, belts, paper or film, and the like. Suitable supports can be subbed by known methods, are generally flexible and typically include such materials as cellulose nitrate film, cellulose acetate film, polyvinyl acetal film, polystyrene film, polyester such as poly(ethylene terephthalate) film, which can be biaxially or asymmetrically stretched, polycarbonate film, and related films or resinous materials, as well as papers, metals such as alluminum or brass, and the like.

The elements of this invention can contain radiation-sensitive image-forming layers in addition to the transparent magnetic recording layers. Such image-forming layers can be photosensitive layers, as exemplified by layers containing photographic silver halides such as silver chloride, silver bromide, silver bromoiodide, silver chlorobromide, and the like, or they can contain non-silver photosensitive materials such as diazo compounds, inorganic and organic photoconductors, photosensitive resins, bichromated colloids, and the like. Suitable radiation-sensitive image-forming layers are those which provide black-and-white or color images.

The transparent magnetic layer and the radiation-sensitive image-forming layers can be coated on either surface of the support. These layers can be superposed on one surface of the support. According to one embodiment of this invention, a transparent support is coated on one of its surfaces with a radiation-sensitive image-forming layer and, on the other surface, with a transparent magnetic recording layer. According to another embodiment, a transparent support is coated successively, on one of its surfaces with a radiation sensitive image-forming layer and a transparent magnetic recording layer. Such a product can also comprise, on the other surface, a second transparent magnetic recording layer.

An element of this invention which comprises a radiation sensitive image-forming layer and at least one transparent magnetic recording layer has a high capacity for information. It also has several advantages over conventional photographic films carrying one or more magnetic tracks or narrow and opaque magnetic stripes which record sound or other information such as latitude, longitude, altitude, etc. For example, in certain motion picture films, a narrow stripe containing magnetic iron oxide in a binder extends along one and/or two edges of the film surface so that one may record sound or other information magnetically. After development of the exposed film, light is transmitted through the area of the film not carrying the magnetic track. This kind of film is satisfactory when its width is small and it is used in the form of spools of relatively small diameter. However, with spools of larger diameter, nonuniform winding results from the increased thickness of these tracks, particularly with large films of the type used in aerial photography. It is obvious that elements made according to this invention are not subject to this disadvantage because the transparent magnetic recording layer can be uniformly coated across the image areas of the film.

The magnetic recording elements of this invention can be used with the usual magnetic recording and reading equipment. Where the element is transparent, it can also be used with a system that takes advantage of this transparency. For example, when a linearly polarized luminous beam crosses a transparent magnetic layer, the polarization plane undergoes a rotation proportionate to the intensity of magnetization of the magnetic material in the layer. This is a result of the Faraday effect. Thus, one can read a transparent magnetic recording element of the type disclosed herein by eliminating any contact between the element and the reading member, by making use of the Faraday effect, e.g. as described in French Pat. No. 2,248,754. In this case, the support used in the element of this invention is advantageously an optically inactive transparent film such as cellulose ester film, as exemplified by cellulose triacetate film.

The intended use of the magnetic recording elements of this invention will determine the specific coercivity of the acicular magnetizable particles employed in the magnetic recording layers. The coercivity of these particles is subject to wide variation, but it is generally at least about 140 Oe, often about 140 to 300 Oe, particularly with undoped acicular gamma ferric oxide, up to about 1000 or 2000 Oe or even higher, particularly for doped acicular gamma ferric oxide such as cobalt doped gamma ferric oxide.

Unlike prior art transparent magnetic recording layers such as described in French Pat. No. 1,227,788 and Canadian Pat. No. 686,172, the transparent magnetic recording layers of this invention have a high density (ratio of the weight of magnetizable particles, in mg., per volume of magnetic layer, in mm$^3$), which provides excellent recording and reproduction properties. This density is at least equal, and is generally superior to those of conventional nontransparent magnetic recording layers; the density of the latter generally being in the range of about 1.5 to 2. As illustrated by the following examples, our transparent magnetic recording layers containing gamma ferric oxide (average particle length of about 0.2 micron) have a density of 2 or greater.

In the following examples the magnetic properties of a magnetic recording layer of this invention are determined by means of its hysteresis loop which is obtained in a conventional manner. As is well known in the art, the hysteresis loop results when the magnetic induction B is plotted in response to an applied magnetic intensity H in a magnetic substance, as H is varied cyclically between equal and oppositely directed values. The coercivity ($H_c$) provides information relating to the magnetic performance of the layer (optimum writing or bias current). The residual flux of the layer ($\phi_r$) from which residual flux per micron of layer thickness is readily determined, constitutes a measure of the potential qualities of the magnetic recording layer. It will be appreciated that these qualities are better for a layer having a greater residual flux per unit of thickness.

As illustrated by the following examples, the optical characteristics of the magnetic recording layers of this invention, can be determined by means of a conventional spectrophotometer. The spectrophotometer provides data for curves of the type set forth in the drawing which curves give the amounts of directly transmitted light ($T_D$) and of diffuse light ($T_S$) as a function of wavelength, for a specific magnetic recording layer and support. Since the supports employed are substantially transparent, these amounts are essentially those of the magnetic recording layer. The total amount of transmitted light is equal to $T_D + T_S$. A quality factor for a given magnetic recording layer in terms of the ratio R, expressed in percent, is determined according to the following:

$$R = \frac{T_D}{T_D + T_S} \times 100$$

The transparent quality of the magnetic recording layers of this invention improves as $T_S$ decreases, i.e., as R approaches 100.

The invention is further illustrated by the following examples of its practice. Example 9 illustrates the results obtained when cubic gamma ferric oxide particles are substituted for the acicular magnetizable particles used in the magnetic recording layers of this invention and was included for comparison purposes.

EXAMPLE 1

150 g. of gamma ferric oxide particles (average length about 0.05 micron, acicularity of 2 to 3) and a collodion obtained by dissolving 15 g. of a partially hydrolyzed vinyl chloride-vinyl acetate copolymer (commercially available under the trade name VAGH from Union Carbide Corp.) in 300 ml of methylisobutylketone were charged to a 1 liter porcelain ball mill containing 1 kg. of glass beads 7 mm in diameter.

After milling for 72 hours a collodion containing 7.5 g. of partially hydrolyzed vinyl chloride-vinyl acetate copolymer and 4.5 g. of tricresyl phosphate 60 ml of methylisobutylketone were added to the mill. Milling was continued for 24 hours to homogenize the dispersion.

The iron-oxide dispersion was separated from the balls, filtered through fritted bronze having a pore size of 5 microns and then degassed in vacuum. The dispersion was coated onto 25 micron thick poly (ethylene terephthalate) support in an amount sufficient to provide a layer 2 microns thick in the dry state. A sample of the element was calendered by passing it through two steel cylinders at 80° C. using a linear pressure of 350 kg/cm. The surface of the resulting magnetic layer had a percent contact area of 80%.

Two other samples of the element, one calendered and one not were dipped in linseed oil.

The total transmission and diffuse transmission of each of these samples at a wavelength of 632.8 nm was determined using a Cary 14 Spectrometer. The wavelength of 632.8 nm is the wavelength emitted by a helium-neon laser. The total transmission through the magnetic recording layer and the support and the ratio between the direct transmission and the total transmission for each of the samples was as follows:

TABLE I

| Sample | Thickness of layer ($\mu$) | Total Transmission (Percent) | Direct Transmission Total Transmission (Percent) |
|---|---|---|---|
| Noncalendered | 2 | 60.5 | 53.5 |
| Noncalendered + oil | 2 | 72.7 | 81.8 |
| Calendered | 1.5 | 68.5 | 84 |
| Calendered + Oil | 1.5 | 77 | 91.9 |

As shown in the above table, the sample of the noncalendered tape had a satisfactory transparency. It can be seen that the transparency was increased substantially by calendering or by impregnation of the magnetic recording layer with linseed oil and the best results were obtained by calendering followed by impregnation with oil.

The magnetic properties of the coated elements of this invention obtained in this and the following examples were determined by means of their hysteresis loop, as previously described herein, using 6.25 mm wide samples. For illustration purposes, these properties were compared with those of a commercially available high quality low noise audio tape, i.e. Kodak Magnetic tape C120 LN. The results obtained with the calendered sample of this example and for the commercial tape are set forth in the following Table II. For comparison purposes, the amount of iron oxide and the thickness of the magnetic layers in the two elements is also set forth in Table II. The coercivity, Hc, is expressed in Oersteds (Oe) and the residual flux, $\phi r$, is webers (Wb).

TABLE II

| | Amount Iron Oxide (g/m$^2$) | Thickness of the layer | Hc (Oe) | $\phi r$ (Wb) | $\phi r/\mu$ (Wb/$\mu$) |
|---|---|---|---|---|---|
| Calendered Sample | 3.2 | 1.5 | 150 | 105.10$^{-11}$ | 70.10$^{-11}$ |
| Kodak magnetic tape C 120 LN | 7.8 | 4.5 | 290 | 25.10$^{-10}$ | 55.10$^{-11}$ |

As shown in the above Table, the residual flux per unit thickness of the sample prepared according to this invention is of the same order of magnitude as that of the commercial tape.

EXAMPLE 2

A magnetic dispersion was prepared as in Example 1 except that the concentration of the binder was increased to 40 parts, by weight, per 100 parts, by weight, of magnetic iron oxide.

This dispersion was coated onto a 25 micron thick poly(ethylene terephthalate) support. After drying the transparent magnetic layer had a thickness of 2.4 microns.

A sample of this product was calendered as in Example 1 and a second sample was imbibed with linseed oil as in Example 1.

The transmission characteristics of these samples were determined as described in Example 1. The results are set forth in the following Table III.

TABLE III

| Sample | Thickness of layer ($\mu$) | Total Transmission (Percent) | Direct Transmission Total Transmission (Percent) |
|---|---|---|---|
| Noncalendered | 2.4 | 56 | 56.1 |
| Noncalendered + oil | 2.4 | 61.4 | 71 |
| Calendered | 2.3 | 59 | 69.2 |

As in Example 1, transparency of the magnetic recording layer is improved by calendering or by imbibing linseed oil into the layer. However, there is less improvement in comparison to the sample in Example 1 because the magnetic recording layer of the sample obtained in this Example 2 contains an amount of binder which is larger than the amount used in Example 1. This renders such a layer less porous and less sensitive to the effects of calendering and impregnation by oil.

EXAMPLE 3

150 g. of acicular gamma ferric oxide doped with cobalt (Co/Fe$_2$O$_3$=4.8% by weight) and having an average length of 0.2$\mu$ and an acicularity of about 8, and a collodion containing 15 g. of partially hydrolyzed vinyl chloride-vinyl acetate copolymer in 240 ml of methylisobutylketone were charged to a 1 liter porcelain ball mill containing 2 kg. of steel balls 8 mm. in diameter.

After 72 hours of milling, a collodion containing 22.5 g. of partially hydrolyzed vinyl chloride-vinyl acetate copolymer, 150 ml of methylisobutylketone and 8 ml. of ethyl cetyl carbonate were added and milling was continued for 24 hours to thoroughly homogenize the dispersion.

After separating the dispersion from the balls, it was filtered through fritted bronze having a pore size of 5$\mu$ and degassed in vacuum. The dispersion was coated on a 37$\mu$ thick cellulose triacetate support. After drying, the element was calendered by passing the magnetic tape between two steel cylinders at 90° C. using a linear pressure of 350 kg/cm.

The magnetic recording layer of this element had a thickness of 3$\mu$, contained 6 mg/m$^2$ of iron oxide and had a density of 2 and a surface smoothness, expressed as percent contact area, of 72%.

The magnetic properties of the magnetic recording layer were determined as in Example 1 and are set forth in the following Table IV. For comparison, the same properties of Kodak magnetic tape C 120 LN are provided. The amount of iron oxide and the thickness of the magnetic layers are also provided.

TABLE IV

| | Amount Iron Oxide (g/m$^2$) | Thickness of the layer | Hc (Oe) | $\phi r$ (Wb) | $\phi r/\mu$ (Wb/$\mu$) |
|---|---|---|---|---|---|
| Sample | 6 | 3 | 980 | 20.10$^{-10}$ | 67.10$^{-11}$ |
| Kodak magnetic tape C 120 LN | 7.8 | 4.5 | 290 | 25.10$^{-10}$ | 55.10$^{-1}$ |

Using a sample of the element prepared according to this Example, total transmission and diffuse transmission were determined as in Example 1. The results were as follows:

TABLE V

| Thickness of the magnetic layer ($\mu$) | Total Transmission (Percent) | Direct Transmission Total Transmission (Percent) |
|---|---|---|
| 3 | 24 | 58 |

EXAMPLE 4

A magnetic dispersion was prepared as in Example 3 except that the concentration of binder was reduced to 20 parts, by weight, per 100 parts, by weight of iron oxide, i.e. the total quantity of binder was 30 g. rather than 37.5 g.

The dispersion was coated as in Example 3, dried and the total transmission and diffuse transmission of the element determined as in Example 1.

The element was calendered as in Example 3 and the transmission characteristics were again determined. The surface of the calendered magnetic layer had a percent contact area of 80%. A sample of the calendered element was dipped in linseed oil and the transmission characteristics were again determined. The results were as follows:

TABLE VI

| Sample | Thickness of layer ($\mu$) | Total Transmission (Percent) | Direct Transmission Total Transmission (Percent) |
|---|---|---|---|
| Non calendered | 5 | 3 | 7 |
| Calendered | 4 | 20 | 69 |

TABLE VI-continued

| Sample | Thickness of layer (μ) | Total Transmission (Percent) | Direct Transmission Total Transmission (Percent) |
|---|---|---|---|
| Calendered + oil | 4 | 27.5 | 84 |

EXAMPLE 5

150 g. of acicular, gamma ferric oxide, (length of 0.2μ and acicularity 6), a collodion obtained by dissolving 22.5 g. of partially hydrolyzed vinyl chloride-vinyl acetate copolymer in 360 ml. of methylisobutylketone and 5 g. of glycol caprylate were charged to a 1 liter porcelain ball mill containing 1 kg. of ceramic balls 7 mm in diameter.

After milling for 120 hours the dispersion was separated from the balls, filtered on a cartridge of fritted bronze having a pore size of 5μ, degassed in vacuum, and coated on a 23μ thick poly(ethylene terephthalate) support. The magnetic recording layer was calendered between two steel cylinders at 80° C. using a linear pressure of 350 kg./cm. The magnetic layer had a density of 2.1 and a surface having a percent contact area of 80%.

The magnetic properties of the recording layer were determined as in Example 1 and are set forth in the following Table VII. This table also provides layer thickness and iron oxide content. For comparison, the corresponding values for Kodak magnetic tape C 120 LN are set forth.

TABLE VII

| | Amount Iron Oxide (g/m$^2$) | Thickness of the layer (μ) | Hc (Oe) | $\phi r$ (Wb) | $\phi r/\mu$ (Wb/μ) |
|---|---|---|---|---|---|
| Sample | 3.2 | 1.5 | 131 | 114.10$^{-11}$ | 76.10$^{-11}$ |
| Kodak magnetic tape C 120 LN | 7.8 | 4.5 | 290 | 25.10$^{-10}$ | 55.10$^{-11}$ |

The transmission characteristics of the sample were determined as in Example 1. The total transmission and diffuse transmission were plotted as a function of wavelength, expressed in nanometers. The curve obtained is set forth in the accompanying drawing.

The magnetic properties of the sample, determined as in Example 1, were as follows:

TABLE VIII

| Thickness of the layer (μ) | Total Transmission (Percent) | Direct Transmission Total Transmission (Percent) |
|---|---|---|
| 1.5 | 63 | 90 |

As seen from the above table the magnetic element of this example has a remarkably high transparency.

EXAMPLE 6

A magnetic element was prepared as described in Example 5 except that a 100μ thich poly(ethylene terephthalate) support was used. The element, after calendering, had a 1.5μ thick transparent magnetic recording layer whose properties were comparable to those set forth in Table VIII.

A negative photographic silver bromoiodide gelatin emulsion layer was coated on the opposite side of the support to provide a photographic element.

EXAMPLE 7

A magnetic dispersion was prepared as described in Example 5 using acicular, gamma ferric oxide doped with cobalt (Co/Fe$_2$O$_3$=1.5%, by weight) and having an average length of 0.2 and an acicularity of about 6. The dispersion was coated onto a 23μ thick poly(ethylene terephthalate) support and calendered as in Example 3. The magnetic recording layer obtained had a density of about 2 and a surface having a smoothness expressed in percent contact area of 80%.

The magnetic properties of the magnetic layer were determined as in Example 1 and are set forth in the following Table IX. This table also provides layer thickness and iron oxide content. For comparison purposes, the corresponding values for Kodak magnetic tape C 120 LN are set forth.

TABLE IX

| | Amount Iron Oxide (g/m$^2$) | Thickness of the layer (μ) | Hc (Oe) | $\phi r$ (Wb) | $\phi r/\mu$ (Wb/μ) |
|---|---|---|---|---|---|
| Sample | 5.7 | 2.8 | 290 | 383.10$^{-11}$ | 68.10$^{-11}$ |
| Kodak magnetic tape C 120 LN | 7.8 | 4.5 | 290 | 25.10$^{-10}$ | 55.10$^{-11}$ |

The transmission characteristics of the sample, determined as in Example 1, were as follows:

TABLE X

| Thickness μ | Total Transmission (Percent) | Direct Transmission Total Transmission (Percent) |
|---|---|---|
| 2.8 | 39 | 72 |

EXAMPLE 8

150 g. of acicular, gamma ferric oxide doped with cobalt (Co/Fe$_2$O$_3$=2.5%, by weight) having an average length of 0.3 to 0.4μ and an average acicularity of about 9, and a collodion obtained by dissolving 15 g. of partially hydrolyzed vinyl chloride-vinyl acetate copolymer in 320 ml of methylisobutylketone were charged to a 1 liter porcelain ball mill containing 1 kg. of ceramic balls 7 mm. in diameter.

After milling for 120 hours, a collodion containing 7.5 g. of partially hydrolyzed vinyl chloride-vinyl acetate copolymer, 100 ml. of methylisobutylketone and 4.5 g. of tricresyl phosphate was added to the mill.

After milling for 24 hours, the dispersion was separated from the balls, filtered on a cartridge of fritted bronze having a pore size of 5μ and then degassed in vacuum. This dispersion was coated onto a 25μ thick poly(ethylene terephthalate) support to obtain a layer 1.8μ thick in the dry state. After drying the layer, a sample of the element was calendered using the conditions of Example 5. Samples of the noncalendered and calendered element were dipped into linseed oil to imbibe the oil into the magnetic layers.

The transmission characteristics of the samples were determined as in Example 1. The results were as follows:

TABLE XI

| Sample | Thickness (μ) | Total Transmission (Percent) | Direct Transmission Total Transmission (Percent) |
|---|---|---|---|
| Noncalendered | 1.8 | 23.6 | 10.6 |
| Noncalendered + oil | 1.8 | 38.7 | 50.2 |
| Calendered | 1.4 | 42 | 58.3 |
| Calendered + oil | 1.4 | 55.2 | 79.3 |

As in the preceding examples, there was a substantial increase in the percentage of total transmitted light and in the direct transmission/total transmission ratio, as a result of calendering and impregnation with linseed oil.

EXAMPLE 9

Cubic gamma ferric oxide particles having average dimensions of about 0.1μ were dispersed and coated and the coated elements were analyzed, all as in Example 1.

The following results were obtained:

TABLE XII

| Sample | Thickness of layer (μ) | Total Transmission (Percent) | Direct Transmission Total Transmission (Percent) |
|---|---|---|---|
| Noncalendered | 2.4 | 6.5 | 0 |
| Noncalendered + oil | 2.4 | 10.5 | 9.5 |
| Calendered | 2.25 | 12.5 | 23.2 |
| Calendered + oil | 2.25 | 18 | 42 |

As shown by the above table, the magnetic recording layers prepared containing the cubic gamma ferric oxide particles were strongly diffusing. Clearly, such oxides are not suitable for use in transparent magnetic recording layers.

The invention has been described in detail with particular reference to preferred embodiments thereof, but it will be understood that variations and modifications can be effected within the spirit and scope of the invention.

We claim:

1. A magnetic recording element comprising a support and a transparent magnetic recording layer having a thickness up to about 5 microns,
    said layer containing acicular, magnetizable particles having an average width of less than about 0.06 micron and an average length up to about 1 micron,
    said particles being ferro- or ferri-magnetic particles having a transmission of at least 10 percent for visible light having a wavelength of 632.8 nm,
    said particles being substantially homogeneously dispersed in a medium comprising a binder and having a refractive index which is substantially the same throughout the thickness of said layer,
    the concentration of said binder being at least about 10 parts per 100 parts by weight, of said particles; up to about 30 parts by weight, for particles having an average length of at least about 0.06 micron and up to about 40 parts, per 100 parts, by weight, for particles having an average length of less than about 0.06 micron,
    said magnetic recording layer having a total transmission of at least 20 percent for visible light having a wavelength of 632.8 nm and a ratio of direct transmission to total transmission at said wavelength of at least 50 percent.

2. A magnetic recording element according to claim 1 wherein said particles have an average length of less than about 0.06 micron.

3. A magnetic recording element according to claim 2 where said support is substantially transparent and said particles are gamma ferric oxide particles having an acicularity of about 2 to 10.

4. A magnetic recording element according to claim 1 where said particles have an average length of at least about 0.06 micron.

5. A magnetic recording element according to claim 4 where said support is substantially transparent and said particles are gamma ferric oxide particles having an acicularity of about 10 to 40.

6. A magnetic recording element according to claim 2 where said magnetic recording layer has a thickness of about 1 to 3 microns and said particles are gamma ferric oxide particles doped with cobalt.

7. A magnetic recording element according to claim 1 where said support is substantially transparent, said magnetic recording layer has a thickness of about 1 to 3 microns and a surface smoothness, determined as percent contact area, of at least 70 percent, and said total transmission is at least 60 percent.

8. A magnetic recording element according to claim 1 where said magnetic recording layer comprises discrete, nonmagnetizable voids that contain a substantially transparent liquid having a refractive index that is substantially the same as that of said binder.

9. A magnetic recording element according to claim 1 comprising a radiation-sensitive image-forming layer.

10. A magnetic recording element according to claim 9 where said radiation-sensitive image-forming layer comprises photographic silver halide and said magnetic recording layer has a surface smoothness, determined as percent contact area, of at least 80 percent.

* * * * *